United States Patent [19]
Hestad

[11] 3,865,979
[45] Feb. 11, 1975

[54] MATRIX CONTROL CIRCUIT

[76] Inventor: Alfred Hestad, 2518 N. Kilbourn, Chicago, Ill. 60639

[22] Filed: June 21, 1973

[21] Appl. No.: 372,225

[52] U.S. Cl. .......................... 179/18 GF, 340/166 R
[51] Int. Cl. .......................................... H04m 7/06
[58] Field of Search .................. 179/18 GE, 18 GF; 340/166 R

[56] References Cited

UNITED STATES PATENTS

| | | | |
|---|---|---|---|
| 3,251,036 | 5/1966 | Smith | 179/18 GF |
| 3,531,773 | 9/1970 | Beebe | 179/18 GF |
| 3,573,384 | 4/1971 | Konidaris et al. | 179/18 GF |
| 3,585,310 | 6/1971 | Gueldenpfenning | 179/18 GF |
| 3,626,111 | 12/1971 | Duval et al. | 179/18 GF |
| 3,646,368 | 2/1972 | Mills | 179/18 GF |
| 3,694,812 | 9/1972 | Enomoro | 179/18 GF |
| 3,720,792 | 3/1973 | Resta | 179/18 GF |

*Primary Examiner*—William C. Cooper
*Assistant Examiner*—Gerald L. Brigance
*Attorney, Agent, or Firm*—Alter Weiss Whitesel & Laff

[57] ABSTRACT

A matrix control circuit using ground potential marks to implement the switch through of a switching network. The ground reduces transients on the matrix during the switching and makes it easier to control the rate of rise of the signal which is especially important when using switching elements, such as silicon control rectifiers. The matrix control circuits also include a constant current source for use in holding the network switched through.

10 Claims, 3 Drawing Figures

MATRIX CONTROL CIRCUIT

This invention relates to switching networks and more particularly to the matrix control portions of link circuits for use in controlling such switching networks.

The communication industry is continually striving to obtain economical and effecient path selection systems. The modern systems use solid state type switching elements at the cross points of such systems. The control circuits used in enabling the switching or blocking of the solid state switching elements make up a major cost portion of the networks. Accordingly, efficient control circuitry is essential to a path selection system for obtaining the best cost per line system.

Among the limitations on networks using solid state cross points is the inherent characteristics of the cross point element where transients caused by pulses such as are used in transmission of data or telegraphic signals tend to cause false operations of the switching elements. Complicated control circuits have been used in the past to overcome these transient problems. The control circuits used in switching networks include the line circuits for linking the telephone sets to the network, the node control circuits, which actually control the enabling of the switching element, and link or matrix control circuits. Basically the function of the line circuits is to provide signals to the switching networks to cause the enabled switching element to switch. The matrix control circuits have a similar function. Where they are allotted or marked, they also act to provide signals to the switching network that act in conjunction with marked line circuits to cause the enabled switching elements to switch through a path extending from an originating or calling line through the switching network to a called line. The link or matrix control circuits further provide the current for holding the paths switched through while communications are in process.

Accordingly, an object of this invention is to provide a path selection system for use in telephone communication featuring unique matrix control circuits for use in such systems.

A related object of this invention is to provide matrix control circuits that transmit ground potential marks to the switching network until a path has been switched through the matrices of the network.

Another object of this invention is to provide matrix control circuits that reduce the transients of the matrices during switching.

Yet another object of this invention is to provide matrix control circuits that control the rate of rise in the voltage applied to the matrices so as not to falsely trigger the switching elements used, especially when the switching elements are silicon controlled rectifiers or other solid state switching elements that are sensitive to rate of rise of the signal.

A preferred embodiment of the invention comprises a cross point network having a plurality of stages. The switching element in the stages are solid state devices, such as silicon controlled rectifiers, which are enabled by relatively simple node control circuits. Matrix control circuits are provided that supply current for holding a matrix path switched on and further monitor the matrix to determine when it is switched on. The matrix control circuits provide ground potentials that are applied to the switching network until the path has been switched through. Means are provided for controlling the rate of rise of the signal used to switch through the enabled switching elements.

The above mentioned and other objects and features of the invention and the manner of obtaining them will become more apparent and the invention itself will be best understood by making reference to the following description of embodiments of the invention taken in conjunction with the accompanying drawings, wherein.

Figure 1:
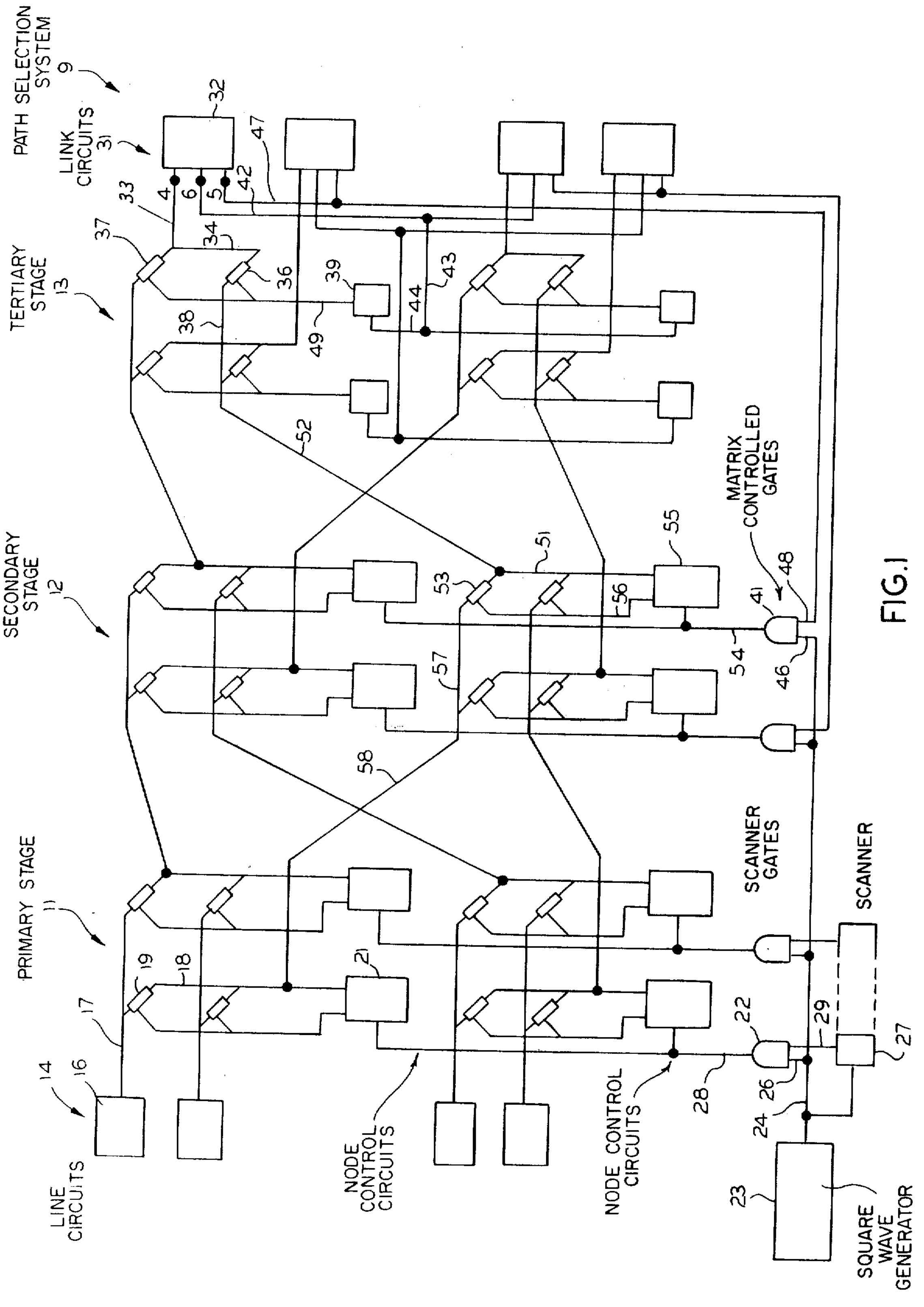
FIG. 1 is a block diagram of a scanner controlled path selection system showing line circuits at the input and links including matrix control circuits at the outputs.

Shown in FIG. 1 is a multi-stage path selection system for use with electrical switching systems, such as those used in telephony. There are shown three switching stages 11, 12 and 13 in the path selection system 9 of FIG. 1. At one end of the path selection system 9 is shown a plurality of line circuits 14. Each of the line circuits, such as line circuit 16, is shown coupled to a horizontal multiple, such as horizontal multiple 17.

In each stage there are vertical multiples, such as vertical multiple 18, positioned for coupling to the horizontal multiples.

Switching elements, such as, for example, switching element 19, are provided for selectively coupling the horizontal and vertical multiples. The switching elements will switch through under certain conditions established by the line circuits and the condition on the vertical multiple 18 associated with switching element 19.

In addition to the signal conditions on the multiples, the switching element 19 must be enabled by a control circuit, such as control circuit 21. The control circuit 21 acts to enable the switching element when it receives an allotment signal from gate means, such as gate 22. The gate 22 transmits a signal that is initiated by a signal generator, such as square wave signal generator 23, shown connected to gate 22 through lines 24 and 26.

The signal generator also acts to step a counter-like scanner 27. The signal from the signal generator is passed through on line 28, when the gate 22 also receives a signal from a scanner 27 over line 29.

When the line circuit is actuated by an off-hook condition, for example, if it is initiating a call, then the matrix control circuits 31, such as matrix control circuit shown at 32, are also allotted and establish conditions on the multiples or leads to which they are connected such as, for example, link circuit 32 connected to horizontal 33. Multiple 33 is connected to the vertical 34 and thereby to a plurality of switching elements, such as switching element 36.

It should be noted that while only switching elements 36 and 37 are shown as coupled to vertical multiple 34, in reality many more switching elements are connected to the vertical multiple 34. The switching elements 36 connect vertical 34 to horizontal 38 in switching through the network.

The matrix control circuits provide different voltage levels and currents on multiples, such as multiple 33, depending on whether the matrix control circuit has been allotted or not. After the switching element 36 is switched to its conducting state, then the matrix control circuit 32 acts to provide the current to hold switching element in its conducting state. Naturally, switching element 36 will not switch through unless it is enabled by a control circuit, such as control circuit 39.

The matrix control circuits provide signals to enable gates, such as gate 41 for example, that provide signals to actuate the control circuits in the intermediate stage 12. In the final or tertiary stage 13 of the circuit of FIG. 1 the control circuits are shown as directly controlled by the link circuits. For example, control circuit 39 is shown as connected to link circuit 32 over leads 43, 42 and 44.

The connection to the gates of the secondary stage, such as gate 41, is shown as leads 24 and 46 coming from signal generator 23. Thus, gate 41 is actuated by a signal from the link over lead 47 connected to gate 41 at input 48, to pass the square wave signal.

The marked kink 32 directly actuates circuit 39 over lead 42, 43 and 44 to provide an enabling signal on lead 49 for switching element 36 and the switching element 36 couples vertical 34 to horizontal 38 if horizontal 38 is idle. Horizontal 38 then connects the link 32 to vertical 51 and associated switching elements, such as element 53, over lead 52. At this time link 32 provides a signal on lines 47 and 48 to gate 41 to cause gate 41 to pass a signal from signal generator 23 through lead 54 to control circuit 55. The control circuit 55 is connected to vertical 51 and is notified that vertical 51 is serching for a horizontal. Therefore, upon receipt of the signal on lead 54, circuit 55 provides an enabling signal on lead 56 to the associated switching elements, such as switching element 53. If the horizontal 57 is not busy, then switching element 53 switches through to connect vertical 51 to horizontal 57. This connection extends over lead 58 to vertical 18 where it is connected through switching element 19 to horizontal 17. Thus, a transmission path is established from initiating line 16 to the link. In a similar manner a transmission path is established from the link back through to a called line, which may be a line among the group of lines 14 or may be a line connected through link 32 to another group of line circuits in a similar manner as has been described with regard to the switching network of FIG. 1.

Figures 2, 3:
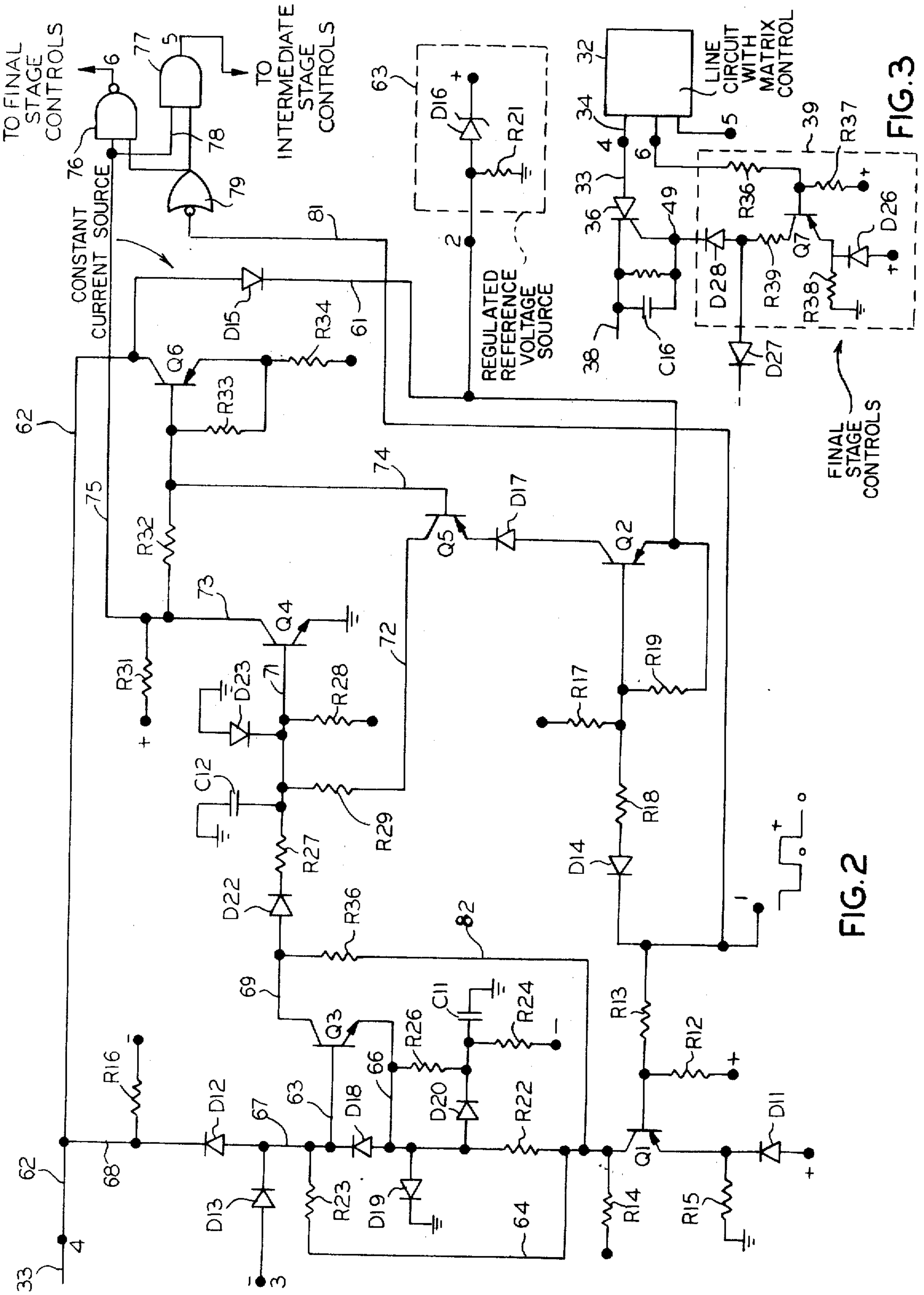
FIG. 2 is a schematic representation of one of the matrix control circuits included in the link shown in FIG. 1.
FIG. 3 is a schematic showing of a cross point element and final stage control circuitry.

FIG. 2 shows, in schematic form, the details of the matrix control circuit portion of the links used in the path selection system of FIG. 1. Means are provided for marking the link. More particularly, terminal 1 is coupled to allotting means, not shown, which provides a marking pulse. A sample marking pulse is indicated proximate to terminal 1. The marking pulse places terminal 1 at ground potential. When terminal 1 is at ground potential, the normally nonconducting PNP type transistor Q1 is switched to its conducting state. Transistor Q1 is shown with its emitter coupled to positive voltage through diode D11. A bias resistor R15 connects the coupling point of the diode D11 and the emitter of transistor Q1 to ground. The base of transistor Q1 is biased to normally keep the transistor in its nonconducting state by positive voltage coupled through resistor R12. Terminal 1 is connected to the coupling point of the base of transistor Q1 and resistor R12 through resistor R13. Thus, when terminal 1 is grounded, the base of transistor Q1 goes from an off biased condition to an on biased condition causing Q1 to conduct.

The collector of transistor Q1 is negatively biased through resistor R14. Terminal 4 of the link circuit is the terminal that is connected to line 33 and therefrom to the switching elements. Terminal 4, and consequently the line in the idle condition of the link, is coupled to negative voltage through resistor R16. The negative voltage is clamped to a value of approximately − 16 volts in a preferred embodiment using a circuit that extends from the junction of resistor R16 and terminal 4 through diodes D12 and D13 to negative voltage on terminal 3.

The marking of terminal 1 with ground voltage also causes normally nonconducting PNP transistor Q2 to switch to its conducting state. More particularly, the base of transistor Q2 is biased to positive voltage through resistor R17 to keep the transistor in its nonconducting condition. The base of transistor Q2 is also coupled to terminal 1 through diode D14 and resistor R18 connected to the junction of resistor R17 and the base of transistor Q2.

The emitter of transistor Q2 is connected to the base through resistor R19. The emitter of transistor Q2 is also coupled to output terminal 4 of the link circuit through line 61, blocking diode D15 and line 62. Diode D15 is coupled with its anode connected to terminal 4 and its cathode connected to the emitter of transistor Q2.

The junction of the cathode of diode D15 and the emitter of transistor Q2 is coupled to input terminal 2. Terminal 2 of the matrix control circuit is coupled to a reference source of positive voltage indicated as reference source 63. The reference source is shown as comprising positive voltage connected to zener diode D16. The junction of the anode of zener diode D16 and terminal 2 is connected to ground through resistor R21.

The collector of transistor Q2 is connected through a positive going diode D17 to the emitter of PNP transistor Q5. The connection of transistor Q5 will be described hereinafter.

Transistor Q3 is an NPN transistor having its base coupled to the collector of transistor Q1 through resistor R22 and positive going diode D18. The base of transistor Q3 is normally biased negative to keep the transistor in the nonconducting state. When transistor Q1 conducts the base of transistor Q3 is coupled to positive voltage through transistor Q1, lead 64, resistor R23 and lead 63. The junction of resistor R22 and diode D18 is coupled to ground through diode D19. The diode D19 has its anode coupled to the junction of resistor R22 and diode D18 with its cathode connected to ground.

The emitter of transistor Q3 is also connected to the junction of diode D18 and resistor R22 over lead 66. The junction of resistor R22 and diode D18 is further coupled to ground through diode D20 having its anode connected to the junction point of resistor R22 and diode D18 and its cathode connected to ground through rate control capacitor C11. The junction of the cathode of diode D20 and capacitor C11 is connected to negative voltage through resistor R24. The junction of diode D20 and capacitor C11 is further coupled to line 66 through resistor R26.

The base of transistor Q3 is connected to terminal 4 through lead 67, diode D12 and lead 68. The collector of transistor Q3 is connected to the base of NPN transistor Q4 through lead 69, diode D22, resistor R27 and lead 71. Transistor Q4 is biased to be normally nonconducting by a negative voltage connected to its base through lead 71 and resistor R28. The base of transistor Q4 is further coupled to the collector of transistor Q5 through a resistor R29 and lead 72. The emitter of transistor Q4 is connected directly to ground. The base of transistor Q4 is coupled to ground through a diode D23 having its anode connected to ground and its cathode connected to the base. The diode D23 is bridged by a capacitor C12. The diode D23 acts to prevent breakdown of the base emitter junction, while the capacitor C12 acts to reduce noise sensitivity of the circuit. The collector of transistor Q4 is biased to positive voltage through resistor R31 and lead 73 connected to the collector of transistor Q4. Also connected to lead 73 through a resistor R32 is the base of transistor Q6. Lead 73, it should be noted, is also connected to terminals 5 and 6 of the matrix control circuit over a circuit that extends over lead 75 and through gates 76 and 77. The output of gate 76 is coupled to terminal 6 which goes directly to the final or tertiary stage node control circuit. The input of gate 76 is coupled to gate 77 through lead 78. The output of gate 77 is terminal 5 which is coupled to the gates, such as gate 41, in FIG. 1. The other input to gate 76 is obtained from inverter 79 and is the marking pulse from terminal 1 connected over lead 81.

The base of PNP transistor Q6 is coupled directly to the base of transistor Q5 over lead 74. The emitter of transistor Q6 is tied to the base of transistor Q6 through resistor R33. Positive bias voltage is coupled to the emitter of transistor Q6 through resistor R34. The collector of transistor Q6 is coupled to terminal 4 through line 62. Transistor Q6 is normally biased to its nonconductive condition by the negative voltage at terminal 4 and the positive voltage extending to the base through resistors R31 and R32. It should be noted that the collector of transistor Q3 is connected to the collector of transistor Q1 through the lead 69, resistor R36 and lead 82.

When a ground mark is placed on terminal 1, then transistor Q1 switches on. The ground mark effectively overcomes the positive bias that is normally placed on the base of transistor Q1 through resistor R12. When transistor Q1 conducts, then the positive voltage that is on the emitter of transistor Q1 is placed on the base of transistor Q3 to switch transistor Q3 to its conducting condition.

The transistor Q2 is also caused to conduct by the mark on terminal 1. The ground mark on terminal 1 passes through diode D14, resistor R18 and effectively cancels out the positive voltage connected to the base of transistor Q2 through resistor R17. When transistor Q2 conducts it passes the ground mark through transistor Q5, if it is in its conducting condition.

The ground mark that is passed through transistor Q1 and placed on terminal 4 passes over horizontal 33 to the switching element. The switching element switches, if it is enabled, responsive to a positive signal on lead 33 while there is a negative signal on the horizontal 38 to which the switching element is connected. Actually the voltage at terminal 4, when transistor Q1 switches on, is effectively ground because diode D19 clamps the circuit to ground. When the switching element, such as switching element 36, switches through, terminal 4 is pulled to the negative potential on horizontal 38 through vertical 34 and line 33. This tendency to go negative causes transistor Q3 to turn off. With transistor Q3 turned off while transistor Q1 is on, then the signal at the base of transistor Q4 is positive rather than ground. Transistor Q4 is thereby switched on. The positive voltage is obtained, of course, through transistor Q1, and passes through lead 82, resistor R36, diode D22, resistor R27 and through lead 71 to the base of transistor Q4. When transistor Q4 is turned on, then the ground on the emitter of transistor Q4 is applied to the base of transistor Q6 and the base of transistor Q5 through resistor R32. This causes the PNP transistors Q5 and Q6 to turn on. Transistor Q6 acts as a constant current source and applies a constant positive current to lead 62 and terminal 4. It supplies current for the matrix and causes the level on the matrix to go to a relatively positive potential. With terminal 4 going to a relatively positive potential, transistor Q3 switches on again; but the current source transistor Q6 is held on, activated through transistors Q2 and Q5 which hold transistor Q4 on to maintain the constant current source through transistor Q6.

Thus, when the link circuit is marked, a ground signal is transmitted through the matrix and is used for switching the matrix through. This makes it easy to control the rate of rise in the voltage applied to the matrix when marking it. The use of the ground signal also reduces transients on the matrix during switching. Since one of the most useful switching elements has been found to be SCR, silicon controlled rectifiers, or PNPN diodes, both of which are susceptible to transients and effected by the rise of the signals applied, the utilization of the ground switching signal is very nice for efficient switching circuitry.

FIG. 3 shows how the signal from terminal 6 of the matrix control portion of the link enables the switching element of the final stage. In the example of FIG. 1 the final stage is shown as the tertiary stage. Link circuit 32 is shown with terminals 4, 5 and 6. Terminal 4 is coupled to the transmission path 33, 34. Terminal 5 leads to gate circuits, such as gate circuit 41, which actuate the node control circuits for the intermediate stages. Terminal 6 is coupled to the node control circuit for the final stage.

When terminal 1 is marked as shown in FIG. 2, a ground potential is placed on terminal 4 over lead 62. After the matrix has switched through, transistor Q6 becomes conducting and a positive voltage is applied to terminal 4. The markpulse applied to terminal 1 is inverted by the gate 79 and is extended via gate 76 to lead 6 and also extended via gate 77 to terminal 5.

The signal on terminal 6 is extended over lead 42 to control circuit 39. The signal on terminal 5 is extended over lead 47 to gates, such as 41, and control circuits 53 and 55. After the matrix has switched through, the output of transistor Q4 goes to ground. The output of transistor Q4 is extended over lead 75 to gates 76 and 77. This signal inhibits those gates, and the control signals from the link over leads 42 and 47 to the matrix. However, those signals are not required after the matrix has switched through.

The ground signal at terminal 6 is coupled to the base of PNP transistor Q7 of control circuit 39 through resistor R36 causing the transistor Q7 to switch to its conducting state. The base of the transistor Q7 is normally biased to positive voltage through biase resistor R37.

The emitter of transistor Q7 is positively biased by its connection to the coupling point of diode D26 connected to positive voltage and resistor R38 connected to ground. The collector of transistor Q7 is connected to the gate of switching element 36, which is a silicon controlled rectifier, through a circuit that includes resistor R39 in series with diode D28. The junction of resistor R39 and diode D28 is connected to the anode of a diode D27. The cathode of this diode is connected to a negative voltage. This limits the signal applied to the gate at switching element 36, such that it cannot be switched on unless lead 38 is more negative than the voltage appearing on the cathode of diode D27. Diode D27 thus clamps the gate signal on switching element 36 to the potential of the negative voltage source.

Means are provided for reducing the noise sensitivity of silicon controlled rectifier 36. More particularly, resistor R41 and capacitor C16 are coupled in parallel from the junction of diode D28 and the gate of silicon controlled rectifier to the cathode of the silicon controlled rectifier.

Thus, normally transistor Q7 is in its nonconducting state; however, when link circuit 32 is marked, a positive signal is placed on terminal 4 and therefore, on the anode of the silicon controlled rectifier. At the same time a ground signal is placed at terminal 6 and is thereby connected to the base of transistor Q7 to cause that transistor to place a positive pulse on the gate of the silicon controlled rectifier and to cause the rectifier to switch to its conducting condition. After switching to the conducting condition, the rectifier remains on until the positive voltage is removed from terminal 4. Thus, the matrix control circuit acts to control the switching of the silicon controlled rectifier 36, when it has been marked. A ground signal is used to control the switching which reduces transients and minimizes the adverse effects of the second differential of the transmission signal.

While the principles of the invention have been described above in connection with the specific apparatus and applications, it is to be understood that this description is made only by way of example, and not as a limitation on the scope of the invention.

I claim:

1. A matrix control switching arrangement for use with automatic switching systems to interconnect selected inlets and outlets, said system comprising a plurality of cascaded matrices arranged in first, intermediate and final stages, each matrix including intersecting horizontal and vertical busses, cross point switching elements for selectively interconnecting selected ones of said horizontal and vertical busses, said switching elements comprising switching devices having separate control paths and communication paths, a matrix control arrangement for applying end marking potentials at the output side of the network to cooperate with end marking potentials at the input side of the network to cause a fan out beginning at the end marked points and extending through the network, said matrix control arrangement being common to a plurality of matrices, said matrix control circuit arrangement comprising means using ground end marking potentials for detecting and switching through the switching network, and means responsive to the switching through of the path for providing holding current therefor.

2. The matrix control circuit arrangement of claim 1 including means for enabling cross point switching elements in the final stage of said multi-stage switching network.

3. The matrix control circuit arrangement of claim 2 wherein said cross point switching elements comprise semi-conductor devices having switching functions that vary in accordance with the slope and frequency of the switching signal, and wherein said enabling means for the final stage includes means for minimizing rate effect on the cross point switching elements.

4. The matrix control circuit arrangement of claim 3 wherein the means for minimizing the rate effect comprises means for controlling the rate of rise of the signal used to switch through an enabled switching element.

5. The matrix control circuit arrangement of claim 1 wherein said ground potential is provided responsive to a mark pulse applied to the input of said matrix control circuit arrangement.

6. The matrix control circuit arrangement of claim 5 wherein said means for providing the ground at the output of said matrix control circuit arrangement comprises a first diode connected to ground, second diode means for normally blocking the first diode to prevent conduction therethrough, and switching means operated by said mark pulse for connecting unblocking voltage to said grounded diode to thereby provide ground to said output responsive to said mark pulse.

7. The matrix control circuit arrangement of claim 1 including constant current source means for providing holding current to said switched through path.

8. The matrix control circuit arrangement of claim 7 wherein the constant current source means comprises a first transistor, said first transistor normally biased to the non-conducting state, and means responsive to changed signal on the switched through path for varying the bias to cause said first transistor to conduct.

9. The matrix control circuit arrangement of claim 8 wherein said last named means comprises a second transistor normally biased to the non-conducting condition, means responsive to the application of the ground signal to the output of said matrix control circuit arrangement followed by the switching through of the path for causing said second transistor to switch on and to thereby cause the first transistor comprising the constant current source means to operate and provide an opposite signal to said switched through path, and further switching means operated responsive to the switching on of the first transistor constant current control to maintain the first transistor in the operated condition even when the opposite signal is on the output.

10. The matrix control circuit arrangement of claim 1 wherein sequential allotting means are provided for controlling the intermediate stage switching elements, and said allotting means including square wave signal generating means.

* * * * *